(12) United States Patent
Wyatt (10) Patent No.: US 8,537,291 B1
(45) Date of Patent: Sep. 17, 2013

(54) SYSTEM, METHOD, AND COMPUTER PROGRAM PRODUCT FOR ADJUSTING AN ANGLE OF POLARIZATION FOR SHUTTER GLASSES

(75) Inventor: David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 204 days.

(21) Appl. No.: 13/159,349

(22) Filed: Jun. 13, 2011

(51) Int. Cl.
*G02F 1/1335* (2006.01)

(52) U.S. Cl.
USPC .......................................................... 349/13

(58) Field of Classification Search
USPC ........................................................... 349/13
See application file for complete search history.

(56) References Cited

U.S. PATENT DOCUMENTS

2011/0317081 A1* 12/2011 Ko .................................. 349/13

* cited by examiner

*Primary Examiner* — Phu Vu
(74) *Attorney, Agent, or Firm* — Zilka-Kotab, PC (57) ABSTRACT

A system, method, and computer program product are provided for determining an angle of polarization for a display device. Further, a polarization associated with shutter glasses is rotated the determined angle for viewing the display device utilizing the shutter glasses.

20 Claims, 5 Drawing Sheets

SYSTEM, METHOD, AND COMPUTER PROGRAM PRODUCT FOR ADJUSTING AN ANGLE OF POLARIZATION FOR SHUTTER GLASSES

FIELD OF THE INVENTION

The present invention relates to display systems, and more particularly to display systems with active shutter glasses.

BACKGROUND

Traditionally, active shutter glasses include an optical stack that includes an active display element between two filtering and polarizing elements. Further, the two filtering and polarizing elements are arranged so an angle of polarization when a shutter of the active shutter glasses is open matches a polarization of a display.

For example, active shutter glasses designed for use with a computer display are usually horizontally polarized, and active shutter glasses designed for use with a television display are usually diagonally polarized.

Thus, in the context of the current example, when the active shutter glasses designed for use with the computer display are used to view the television display, an intensity of a visible signal is reduced since an angle of polarization of light exiting the television display is different from an angle of polarization of the active shutter glasses designed for use with the computer display.

There is thus a need for addressing these and/or other issues associated with the prior art.

SUMMARY

A system, method, and computer program product are provided for determining an angle of polarization for a display device. Further, a polarization associated with shutter glasses is rotated the determined angle for viewing the display device utilizing the shutter glasses.

DETAILED DESCRIPTION

Figure 1:
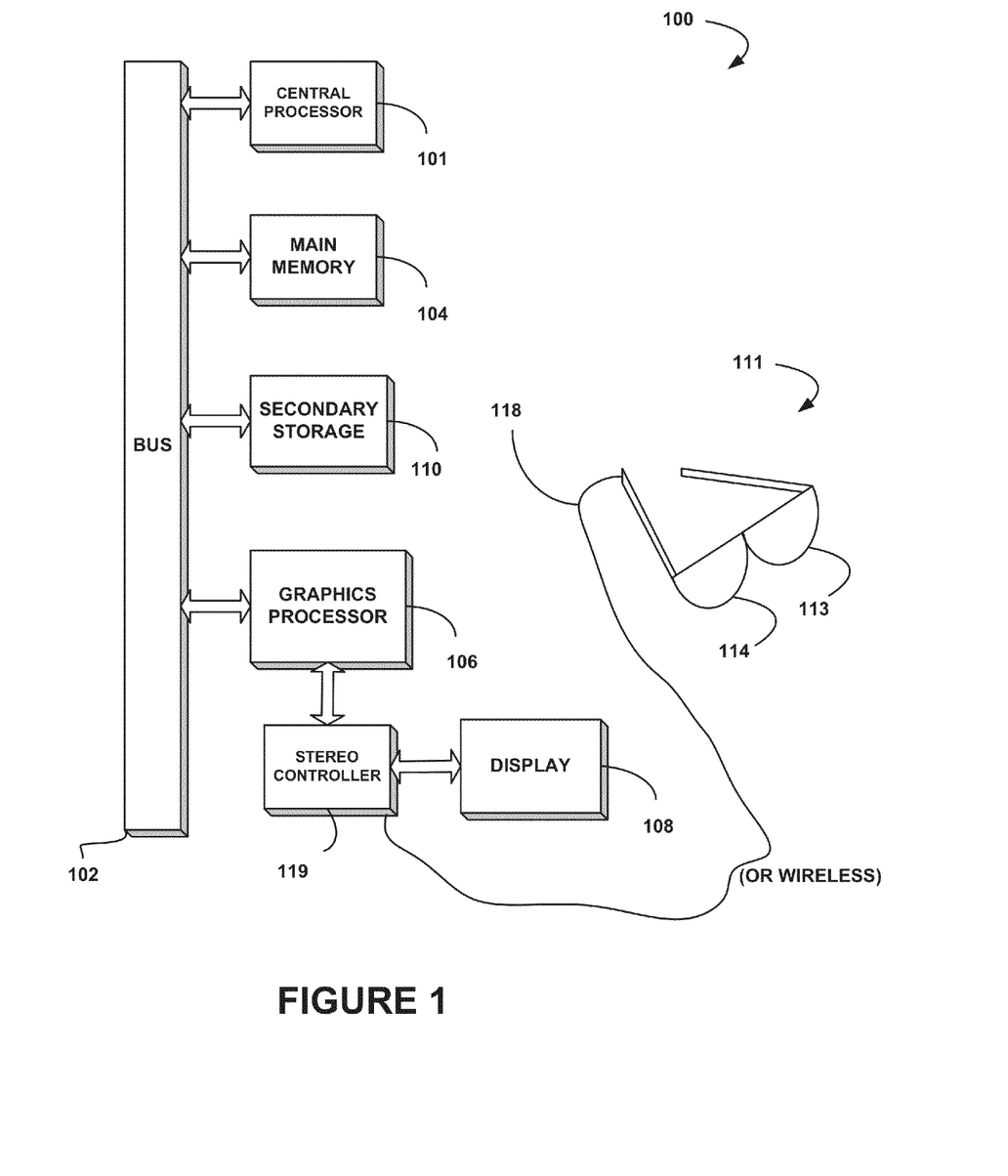
FIG. 1 illustrates an exemplary computer system in which the various architecture and/or functionality of various embodiments may be implemented.

FIG. 1 illustrates an exemplary computer system 100 in which the various architecture and/or functionality of various embodiments may be implemented. As shown, a computer system 100 is provided including at least one host processor 101, which is connected to a communication bus 102. The computer system 100 also includes a main memory 104. Control logic (software) and data are stored in the main memory 104 which may take the form of random access memory (RAM).

The computer system 100 also includes a graphics processor 106 and a display 108 in the form of a liquid crystal display (LCD), digital light processing (DLP) display, liquid crystal on silicon (LCOS) display, organic light emitting diode (OLED) display, plasma display, or other similar display. In one embodiment, the graphics processor 106 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 100 may also include a secondary storage 110. The secondary storage 110 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 104 and/or the secondary storage 110. Such computer programs, when executed, enable the computer system 100 to perform various functions. Main memory 104, secondary storage 110 and/or any other storage are possible examples of computer-readable media.

Further included is a pair of shutter glasses 111 capable of being worn on a face of a user. While the shutter glasses 111 are shown to include two elongated members for supporting the same on the face of the user, it should be noted that other constructions (e.g. member-less design, head strap, helmet, etc.) may be used to provide similar or any other type of support. As further shown, the shutter glasses 111 also include a right eye shutter 114 and a left eye shutter 113.

Both the right eye shutter 114 and left eye shutter 113 are capable of both an open orientation and a closed orientation. In use, the open orientation allows more light therethrough with respect to the closed orientation. Of course, such orientations may be achieved by any desired mechanical, electrical, optical, and/or any other mechanism capable of carrying out the above functionality.

For control purposes, the shutter glasses 111 may be coupled to a stereo controller 119 via a cable 118 (or without the cable 118 in a wireless environment). As an example, in the wireless environment, the shutter glasses 111 may be in communication with an emitter coupled to the stereo controller 119, the communication bus 102, etc. The stereo controller 119 is, in turn, coupled between the graphics processor 106 and the display 108 for carrying out the functionality to be set forth hereinafter. While the stereo controller 119 is shown to reside between the graphics processor 106 and the display 108, it should be noted that the stereo controller 119 may reside in any location associated with the computer system 100, the shutter glasses 111, and/or even in a separate module, particularly (but not necessarily) in an embodiment where the graphics processor 106 is attached to a separate interface [e.g. universal serial bus (USB), etc.] on the computer system 100. In one embodiment, the display 108 may be directly connected to the computer system 100, and the stereo controller 119 may further be directly connected to the computer system 100 via a USB interface. Still yet, the stereo controller 119 may comprise any hardware and/or software capable of the providing the desired functionality.

Specifically, in some embodiments, the right eye shutter 114 and left eye shutter 113 are controlled to switch between the closed orientation and the open orientation. As an option, the right eye shutter 114 and left eye shutter 113 of the shutter glasses 111 may be controlled such that the right eye shutter 114 and left eye shutter 113 simultaneously remain in the closed orientation for a predetermined amount of time.

In addition to and/or instead of the foregoing technique, the stereo controller 119, the display 108, and/or any other appropriate hardware/software associated with the computer system 100 may be equipped with functionality for adapting the display 108 in a way that enhances a viewing experience when display content is viewed utilizing the shutter glasses 111.

For example, in one embodiment, the architecture and/or functionality of the various following figures may be implemented in the context of the host processor 101, graphics processor 106, a chipset (i.e. a group of integrated circuits designed to work and sold as a unit for performing related functions, etc.), and/or any other integrated circuit for that matter. Still yet, the architecture and/or functionality of the various following figures may be implemented in the context of a general computer system, a circuit board system, a game console system dedicated for entertainment purposes, an application-specific system, and/or any other desired system.

For example, the system 100 may take the form of a desktop computer, lap-top computer, and/or any other type of logic. Still yet, the system 100 may take the form of various other devices including, but not limited to, a personal digital assistant (PDA) device, a mobile phone device, a television, etc.

Further, while not shown, the system 100 may be coupled to a network [e.g. a telecommunications network, local area network (LAN), wireless network, wide area network (WAN) such as the Internet, peer-to-peer network, cable network, etc.) for communication purposes.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
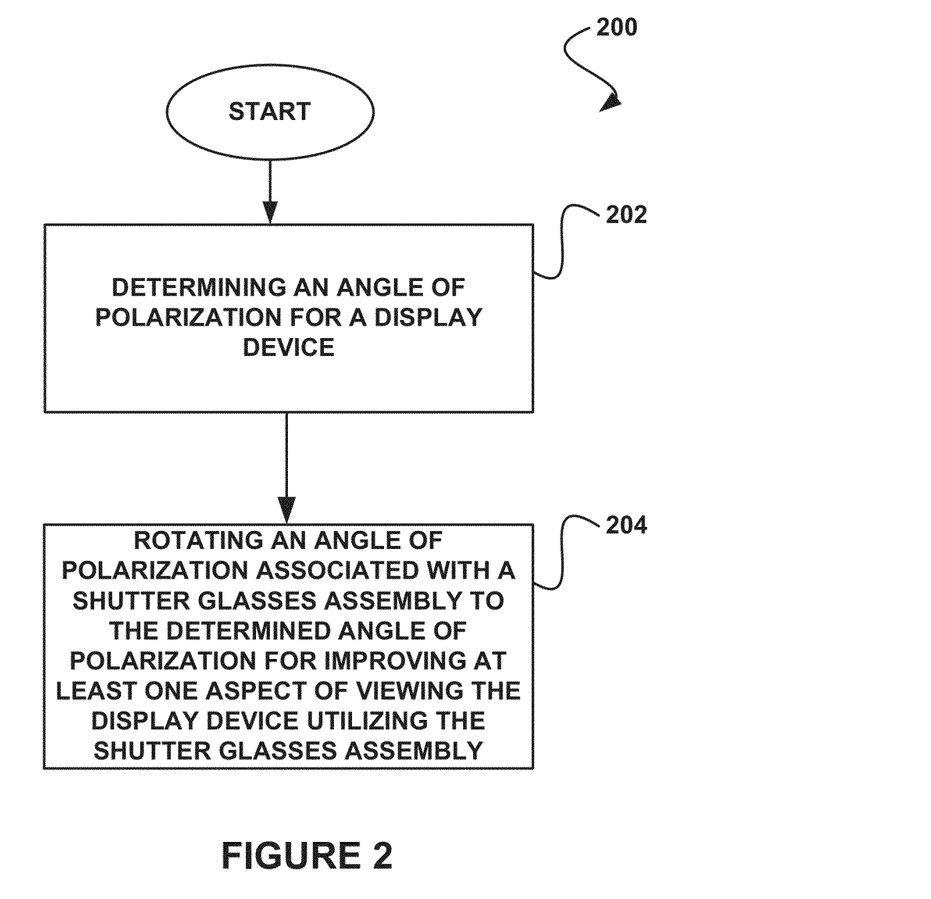
FIG. 2 shows a method for rotating a polarization associated with shutter glasses, in accordance with one embodiment.

FIG. 2 shows a method 200 for rotating a polarization associated with shutter glasses, in accordance with one embodiment. As an option, the present method 200 may be implemented in the context of the functionality and architecture of FIG. 1. Of course, however, the method 200 may be carried out in any desired environment. It should also be noted that the aforementioned definitions may apply during the present description.

As shown, an angle of polarization for a display device is determined. See operation 202. In the context of one embodiment, the display device may include a computer display monitor, an internal display panel of a portable device, a television display, a device capable of projecting images in sequence for transmission to at least one viewer equipped with shutter glasses, or any other display such as the display 108 of FIG. 1. In another embodiment, the display device may emit light that is polarized. As an example, the display device may include at least one polarizing layer that may polarize the emitted light. Optionally, each type of display device may polarize the emitted light at a particular angle or orientation. For example, the light emitted from a computer display may be diagonally polarized. As another example, the light emitted from a television display may be horizontally polarized. Further, as still yet another example, the light emitted from the display device may be polarized at any angle or orientation.

In yet another embodiment, the angle of polarization for the display device is determined based on the display device. As an option, the type of the display device may be detected. Optionally, the type of the display device may include a manufacturer of the display device, a model of the display device, an identifier of the display device, a name of the display device, a revision of the display device, a serial number of the display device, a class of the display device, etc.

Furthermore, in still yet another embodiment, the type of the display device may be determined based on extended display identification data (EDID) of the display device. For example, the type of the display device may be detected based on the EDID of the display device. Additionally, as an option, the EDID may indicate the angle of polarization for the display device. Furthermore, as yet another option, the angle of polarization for the display device may be predetermined based on the type of the display device. Optionally, based on the type of the display device, the angle of polarization may be determined for the display device. As an example, the angle of polarization for the display device may be determined by retrieving an angle of polarization associated with the type of display device from storage (e.g. memory, register, cache, database, data store, etc.). Further, as another example, each manufacturer and model of the display device may be associated with a particular angle of polarization.

Additionally, in one embodiment, the angle of polarization for the display device may be determined utilizing an algorithm. In the context of the current embodiment, the algorithm may include presenting a plurality of images to a user via the display device and changing an angle of polarization associated with shutter glasses (i.e. a shutter glasses assembly) for each image. Furthermore, in the context of the current embodiment, the angle of polarization for the display device is determined based on the user's feedback for each presented image and the angle of polarization associated with shutter glasses.

Further, the image may optionally include a color image (e.g. a solid color image of any color) such as a white image, a red image, a blue image, a yellow image, a green image, etc. Additionally, as another option, the image may include any combination of colors, patterns, shapes, graphics, etc. Optionally, the user's feedback may include at least one subject indicator that a current image being presented is brighter, dimmer, clearer, and more distorted than a previous image or a previous setting. For example, the determined angle of polarization for the display device may include the angle of polarization associated with shutter glasses that provides the brightest and clearest image to the user.

In addition, the shutter glasses may optionally include active shutter glasses (e.g. where polarization elements of the active shutter glasses are capable of being kept in a constant state in order to emulate operation of passively polarized glasses), stereo glasses, etc. For example the shutter glasses may include the shutter glasses 111 of FIG. 1, etc. As another option, the angle of polarization associated with the shutter glasses may be changed in fine increments (e.g. 0.5°, 1°, 1.5°, etc.), coarse increments (15°, 20°, 25°, etc.), or any other increment. Further, as yet another option, a search algorithm (e.g. a binary search, etc.) may be utilized for changing the angle of polarization associated with the shutter glasses.

Furthermore, in another embodiment, based on the user's feedback for each image, the determined angle of polarization for the display device may include the angle of polarization associated with the shutter glasses that results in the brightest and/or clearest image. Optionally, the determined angle of polarization for the display device may be stored. Additionally, the determined angle of polarization for the display device may be stored in a memory, a register, a cache, a database, a disk, etc. For example, the determined angle of polarization for the display device may be stored in the database in association with the EDID of the display device.

Additionally, in yet another embodiment, the user may indicate the type of the display device. As an option, the user may indicate that the type of the display device is a computer display, a television display, etc. Further, as another option, the user may indicate the type of the display device via a switch (e.g. a switch with positions to indicate auto detect, computer display monitor, internal display panel, television display, etc.) on the shutter glasses, a switch on an emitter (e.g. a wireless emitter such as an infrared emitter, an electromagnetic emitter, etc.) associated with the shutter glasses, software associated with the shutter glasses, etc. As still yet another option, the emitter may include any device that is capable of transmitting information, instructions, data, etc. to the shutter glasses.

In still yet another embodiment, the angle of polarization for the display device may be determined utilizing a light sensor. Optionally, the light sensor may include any light sensor capable of measuring the brightness, clarity, color, luminosity, etc. of an image. Furthermore, as an option, the light sensor may be located behind a shutter of the shutter glasses. For example, the light sensor may be located behind an optical stack of a shutter of the shutter glasses. Furthermore, as yet another example, the light sensor may be attached to the optical stack, located a distance behind the optical stack, etc.

For example, the light sensor may provide an indication of the brightness for each image presented without any user feedback. As another option, the determined angle of polarization for the display device may include the angle of polarization associated with the shutter glasses that provides the brightest image to the light sensor. For example, for each image presented and for each angle of polarization associated with the shutter glasses, the light sensor may measure a luminance of light transmitted through the optical stack of the shutter glasses and provide feedback that is utilized to determine the angle of polarization for the display device.

Furthermore, an angle of polarization associated with shutter glasses is rotated to the determined angle of polarization for improving at least one aspect of viewing the display device utilizing the shutter glasses. See operation 204. Thus, the angle of polarization associated with the shutter glasses may be set to the determined angle of polarization for the display device. As noted above, rotating the angle of polarization associated with shutter glasses to the determined angle of polarization improves at least one aspect of viewing the display device utilizing the shutter glasses, such as a brightness, clarity, etc. viewed by a user utilizing the shutter glasses to view an image displayed by the display device.

In one embodiment, the angle of polarization associated with the shutter glasses may be changed by changing the angle of polarization of the optical stack for each shutter of the shutter glasses to match the angle of polarization for the display device. As an option, the shutter glasses may be constructed to block transmission of light when a specific charge is applied. As another option, the shutter glasses may be constructed to rotate the polarization of the light and therefore permit the transmission of the light when the specific charge is applied.

In another embodiment, the shutter glasses may include an optical stack for a left eye shutter and an optical stack for the right eye shutter. Further, in the context of the current embodiment, each optical stack may include at least two display elements and at least two filtering and polarizing elements. As another option, each optical stack may be arranged with a first display element in front of a first filtering and polarizing element, and a second display element behind the first filtering and polarizing element and in front of a second filtering and polarizing element. For example, each optical stack may be arranged in order of the first display element, the first filtering and polarizing element, the second display element, and the second filtering and polarizing element.

In yet another embodiment, each display element may include a liquid crystal display (LCD) that is capable of changing a polarization of light. Optionally, the first display element and the second display element may be of the same type or of a different type. As another option, the LCD changes the polarization of the light based on a voltage applied to the LCD. As yet another option, an angle of rotation of the polarization of the light for the LCD may be based on the voltage applied to the LCD. For example, the angle of rotation of the polarization of the light for the LCD may be proportional to the voltage applied to the LCD.

In still yet another embodiment, each filtering and polarizing element may permit a transmission of light in one axis. Additionally, as an option, each filtering and polarizing element may rotated 90° from each other. Furthermore, as another option, an LCD element located between each filtering and polarizing element may twist the angle of the light that passes through the LCD element. For example, when each filtering and polarizing element is rotated 90° from each other, an eye shutter of the shutter glasses may be altered between transparent and fully opaque by applying a charge to an LCD element between each filtering and polarizing element, which causes an angle of polarization of the light transmitted through the LCD element to rotate 90° from the angle of the first filtering and polarizing element thereby allowing transmission of the light through the second filtering and polarizing element.

Furthermore, as yet another option, each filtering and polarizing element may be at a same angle as each other. As another example, when each filtering and polarizing element are at the same angle as each other, an eye shutter of the shutter glasses may be altered between transparent and fully opaque by applying a charge to the LCD element between each filtering and polarizing element, which causes an angle of polarization of the light transmitted through the LCD element to rotate 90° from the angle of the first filtering and polarizing element thereby blocking the light through the second filtering and polarizing element.

In one embodiment, the polarization associated with the shutter glasses may be rotated to the determined angle of polarization utilizing the first display element of each shutter. As an option, the polarization may be rotated to the determined angle by altering a voltage applied to the first display element of each shutter. For example, the angle of polarization of each shutter of the shutter glasses may be changed to the determined angle of polarization by altering the voltage applied to the first display element of each optical stack to match the determined angle. Furthermore, as another example, rotating the angle of polarization of each first filtering and polarizing element to match the angle of polarization for the display device results in the light emitted by the display device passing through all of the filtering and polarizing elements of an open shutter.

Figure 3:
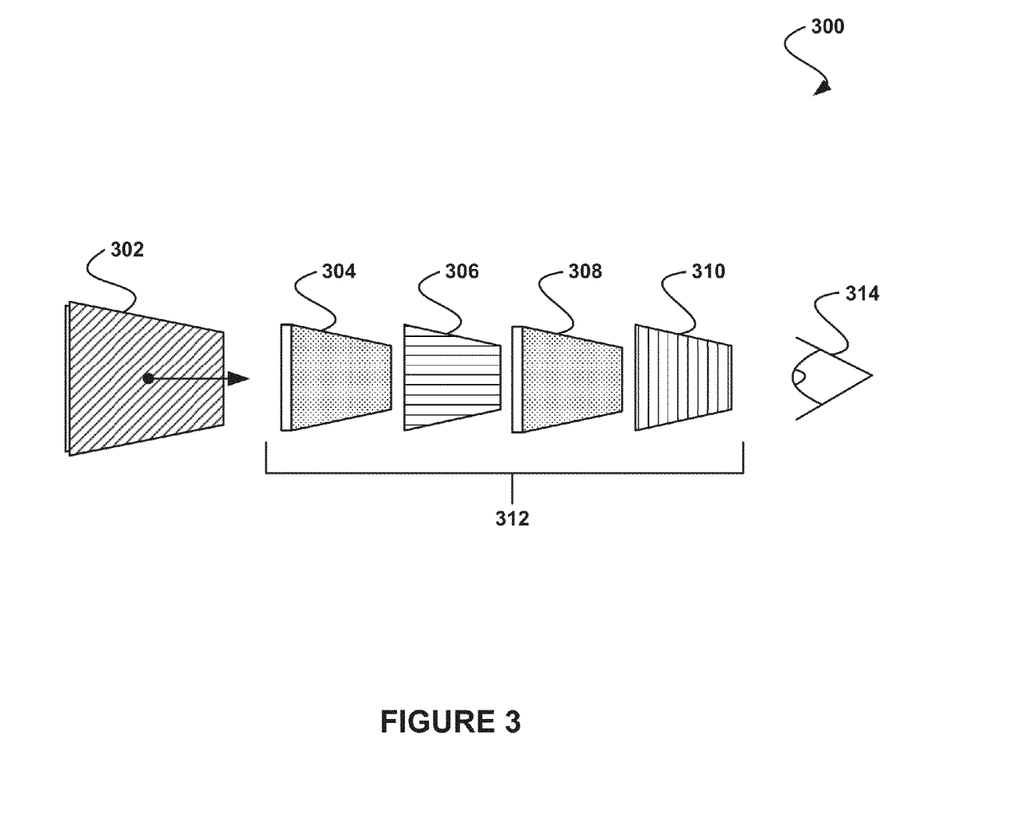
FIG. 3 shows an exemplary system for rotating a polarization of an optical stack for viewing a display device, in accordance with another embodiment.

FIG. 3 shows an exemplary system 300 for rotating a polarization of an optical stack for viewing a display device, in accordance with another embodiment. As an option, the present system 300 may be implemented to carry out the method 200 of FIG. 2. Of course, however, the system 300 may be implemented in any desired environment. It should also be noted that the aforementioned definitions may apply during the present description.

In one embodiment, as shown in FIG. 3, an optical stack 312 includes a first display element 304, a first filtering and polarizing element 306, a second display element 308, and a second filtering and polarizing element 310. For example, as illustrated in FIG. 3, the first filtering and polarizing element 306 includes a horizontal polarization and the second filtering and polarizing element 310 includes a vertical polarization. However, the first filtering and polarizing element 306 and the second filtering and polarizing element 310 may include any polarization angle.

As an option, the first display element 304 may be configured to rotate an angle of polarization of light emitted from the display device 302 to match a polarization angle of the first filtering and polarizing element 306. Further, as another option, an amount of rotation of the angle of polarization of the light by the first display element 304 may be controlled via a voltage applied to the first display element 304. Additionally, as yet another option, the angle of the rotation of the light transmitted through the first display element 304 may be proportional to voltage squared ($V^2$).

Optionally, applying additional voltage to the first display element 304 may increase the angle of polarization of the light transmitted through the first display element 304. Additionally, as another option, applying less voltage to the first display element 304 may decrease the angle of polarization of the light transmitted through the first display element 304. For example, when the angle of polarization of the light emitted from the display device 302 is set at 45°, the polarization angle of the emitted light may be rotated 45° to match the angle of polarization of the first filtering and polarizing element 306 by applying a lower than normal voltage to the first display element 304.

In another embodiment, the first filtering and polarizing element 306 may transmit light based on the angle of polarization of the light transmitted through the first display element 304 and the angle of polarization of the light transmitted through the first filtering and polarizing element 306. For example, an amount of light transmitted through a filtering and polarizing element may be defined by the following formula:

$$L_2 = L_1 * \cos^2(\theta_2 - \theta_1)$$

Where in the preceding formula, $L_1$ is an input luminance of the light, $\theta_1$ is an angle of polarization of the light, $\theta_2$ is an angle of polarization of the filtering and polarizing element, and $L_2$ is a resulting luminance of the light from the filtering and polarizing element. In the context of the preceding formula, the luminance of the light is a measure of an intensity, brightness, etc. of the light. Therefore, as illustrated in the preceding formula, the luminance of the light input to the first filtering and polarizing element 306 is reduced proportional to the difference in the angle of polarization of the light input to the first filtering and polarizing element 306 and the angle of the first filtering and polarizing element 306.

Additionally, in yet another embodiment, the first filtering and polarizing element 306 may transmit light to the second display element 308. As an option, the second display element may rotate the angle of polarization of the light to match an angle of polarization of the second filtering and polarizing element 310. For example, when a voltage is applied to the second display element 308, the second display element 308 may rotate the angle of polarization of the light to match the angle of polarization of the second filtering and polarizing element 310 in order to allow the light to be transmitted through the second filtering and polarizing element 310. Additionally, as yet another example, when a voltage is applied to the second display element 308, the second display element 308 may rotate the angle of polarization of the light to be 90° out of phase with the angle of polarization of the second filtering and polarizing element 310 in order to prevent the light from being transmitted through the second filtering and polarizing element 310.

Furthermore, in yet another embodiment, the angle of polarization of the light emitted from the display device 302 may be rotated by the first display element 304 to match the angle of polarization of the first filtering and polarizing element 306 in order to provide full luminosity of the light emitted from the display device 302 through the optical stack 312 to a viewer 314. Additionally, in one embodiment, based on an angle of polarization determined for the display device 302, the voltage applied to the first display element 304 may be changed in order to rotate the angle of polarization of the light transmitted through the first display element 304 to match the angle of polarization of the first filtering and polarizing element 306.

Figure 4:
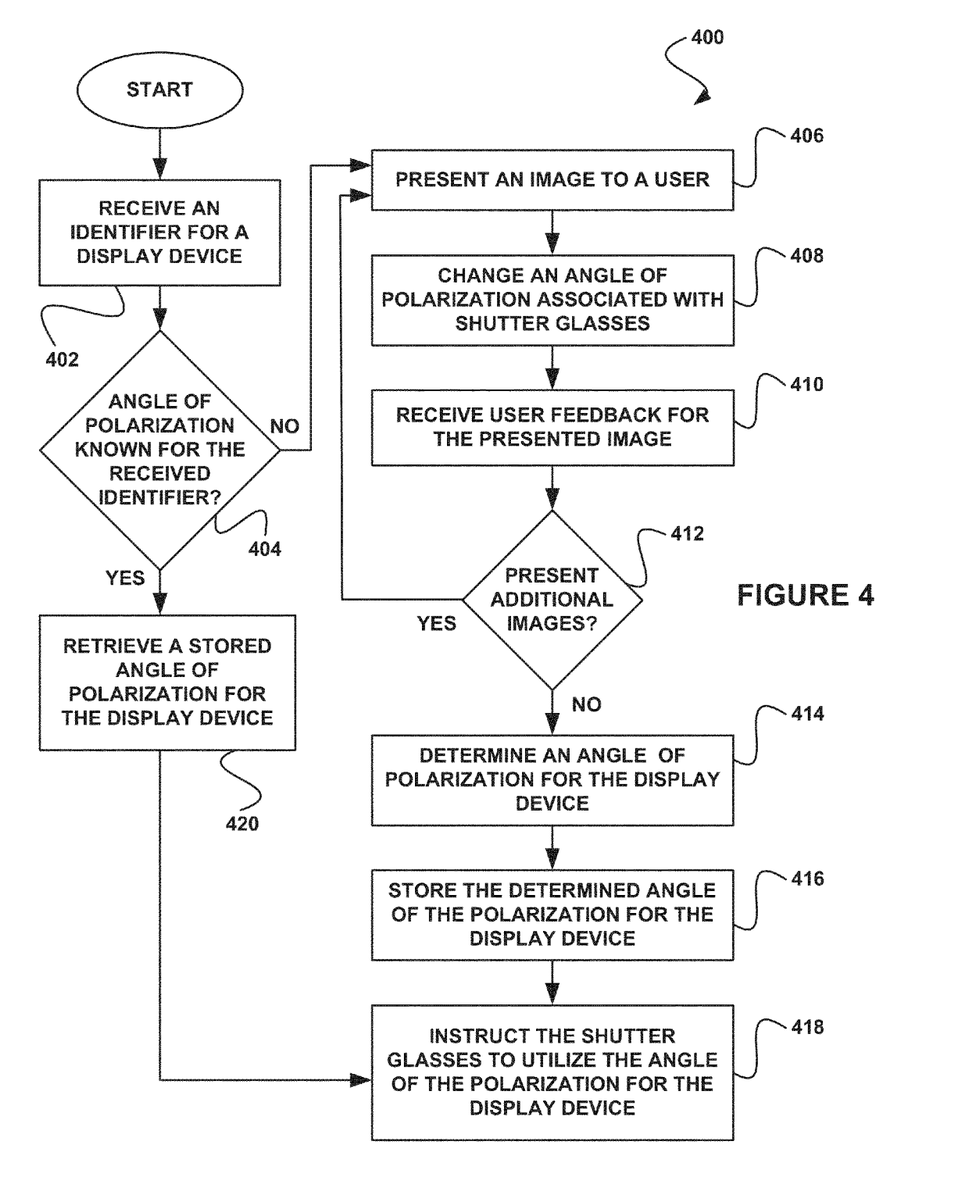
FIG. 4 shows a method for determining an angle of polarization for a display device, in accordance with yet another embodiment.

FIG. 4 shows a method 400 for determining an angle of polarization for a display device, in accordance with yet another embodiment. As an option, the present method 400 may be implemented in the context of the functionality and architecture of FIGS. 1-3. Of course, however, the method 400 may be carried out in any desired environment. It should also be noted that the aforementioned definitions may apply during the present description.

As shown in operation 402, an identifier for a display device is received. As an option, the identifier may include an EDID associated with the display device. As yet another option, the identifier may be received in response to the display device being attached, powered on, etc. For example, the EDID may be received from the display device in response to the display device being attached. Further, in decision 404, it is determined if an angle of polarization is known for the display device associated with the received identifier.

Further, as shown in operation 406, if the received identifier is unknown and/or if the angle of polarization is not known for the display device associated with the received identifier, then an image is presented to a user. As an option, the image presented to the user may include a single image from a series of images presented to the user. Further, as yet another option, the image may include a solid color image (e.g. an all white image, etc.).

Further, for each image presented to the user, the angle of polarization associated with shutter glasses is changed. See operation 408. Optionally, the angle of polarization associated with the shutter glasses is incremented for each image presented. As another option, a search algorithm may be utilized to determine the angle of polarization associated with the shutter glasses for each presented image. For example, a binary search algorithm may be utilized in changing the angle of polarization associated with the shutter glasses for each presented image. As still yet another option, the angle of polarization associated with the shutter glasses may be changed by varying a charge to a front display element for each shutter of the shutter glasses to rotate a polarization of light transmitted by each front display element.

In addition, as shown in operation 410, user feedback is received for the presented image. As an option, the user feedback may be received through an interface. Optionally, the interface may include any interface capable of receiving feedback from the user. For example, the interface may include an application programming interface (API), a graphical user interface, an audible user interface, a tactile user interface, etc. Furthermore, in one embodiment, the user may be asked about a brightness, clarity, etc. of the current image. Optionally, the user may be asked to provide feedback on a currently presented image versus a previously presented image. As yet another option, the user may be asked to provide feedback on which presented image was the brightest and/or clearest.

Additionally, based on the user feedback received, it is determined if additional images should be presented. See decision 412. If additional user feedback is required, the method 400 continues to operation 406. etc. to present another image to the user. If additional user feedback is not required, the method 400 continues to operation 414. Optionally, the decision 412 may be made based upon the feedback provided by the user, a number of images presented to the user, a result of the search algorithm, etc.

As shown in operation 414, an angle of polarization for the display device is determined. Optionally, the angle of polarization for the display device is determined based on the user feedback for each image presented with at least one different angle of polarization. For example, based on the user feedback, the angle of polarization associated with the shutter glasses that provided the user the brightest and/or clearest image may be determined to match the angle of polarization for the display device.

Additionally, the determined angle of polarization for the display device is stored. See operation 416. As an option, the determined angle may be stored in any storage capable of storing the determined angle in association with the display device. Additionally, as another option, the determined angle may be stored in association with the received identifier for the display device. As an example, the determined angle of polarization for the display device may be stored in memory in association with the received EDID for the display device.

Furthermore, as shown in operation 418, the shutter glasses are instructed to utilize the angle of polarization for the display device. As an option, the shutter glasses may be instructed, configured, reconfigured, etc. to set the angle of polarization associated with the shutter glasses to match the determined angle of polarization for the display device.

In addition, as shown in operation 420, if it is determined in decision 404 that an angle of polarization is known for the display device associated with the received identifier, a stored angle of polarization for the display device is retrieved. As an option, the stored angle of polarization for the display device may be predetermined based on the identifier of the display device. Optionally, the stored angle of polarization for the display device may include the determined angle stored (e.g. in memory) in operation 416. Further, as yet another option, the angle of polarization may be included in the received identifier. For example, the stored angle of polarization may be retrieved from the received identifier, from a database, from memory, etc.

Furthermore, as shown in operation 418, the shutter glasses are instructed to utilize the angle of polarization for the display device. Additionally, as an example, the emitter in communication with the shutter glasses may communicate the determined angle of polarization to the shutter glasses, and the shutter glasses may set the angle of polarization associated with the shutter glasses to the determined angle.

For example, when the display device is attached, the EDID for the display device is received, and if it is determined that the received EDID is associated with a previously stored or determined polarization angle for the display device, then the shutter glasses may be instructed via the emitter to utilize the polarization angle of the display device in setting the angle of rotation of the polarization associated with the shutter glasses.

Figure 5A:
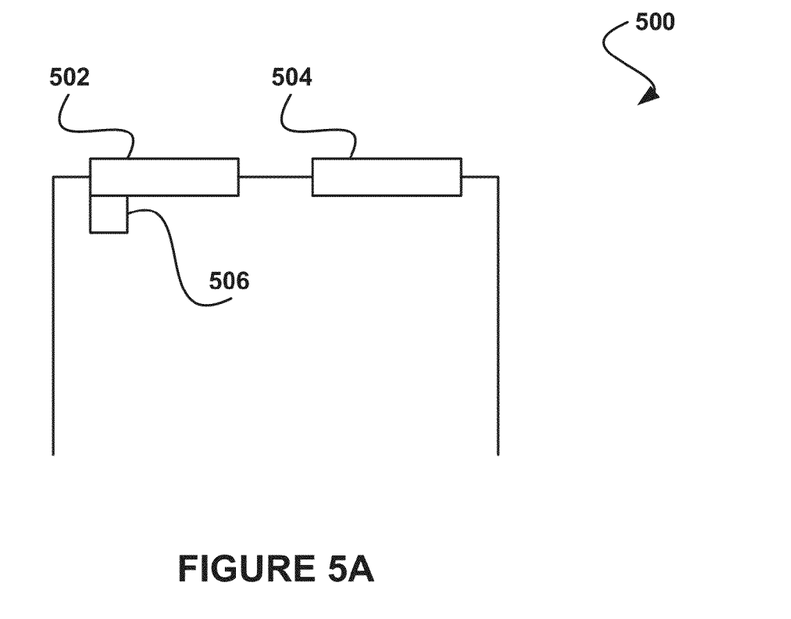
FIG. 5A shows an exemplary system for using a light sensor to determine an angle of polarization for a display device, in accordance with still yet another embodiment.

FIG. 5A shows an exemplary system 500 for using a light sensor to determine an angle of polarization for a display device, in accordance with still yet another embodiment. As an option, the present system 500 may be implemented in the context of the functionality and architecture of FIGS. 1-4. Of course, however, the system 500 may be implemented in any desired environment. It should also be noted that the aforementioned definitions may apply during the present description.

In one embodiment, the shutter glasses 500 may include a left eye shutter 502, and a right eye shutter 504. As an option, a light sensor 506 may be attached to the left eye shutter 502. As another un-illustrated option, the light sensor 506 may be attached to the right eye shutter 504. Furthermore, as yet another un-illustrated option, the light sensor 506 may be attached to both the left eye shutter 502, and the right eye shutter 504. Further, as another option, the light sensor 506 may be located behind a shutter of the shutter glasses 500, associated with the shutter of the shutter glasses 500, separate from the shutter of the shutter glasses 500, etc.

Additionally, in yet another embodiment, the light sensor 506 may be utilized to provide feedback utilized to determine an angle of polarization for the display device, as shown in steps 406-410 of FIG. 4. Furthermore, in still yet another embodiment, the light sensor 506 may be utilized to determine the angle of polarization by comparing a luminance of light input to the shutter glasses to a luminance of light output from the shutter glasses to the light sensor 506.

Figure 5B:
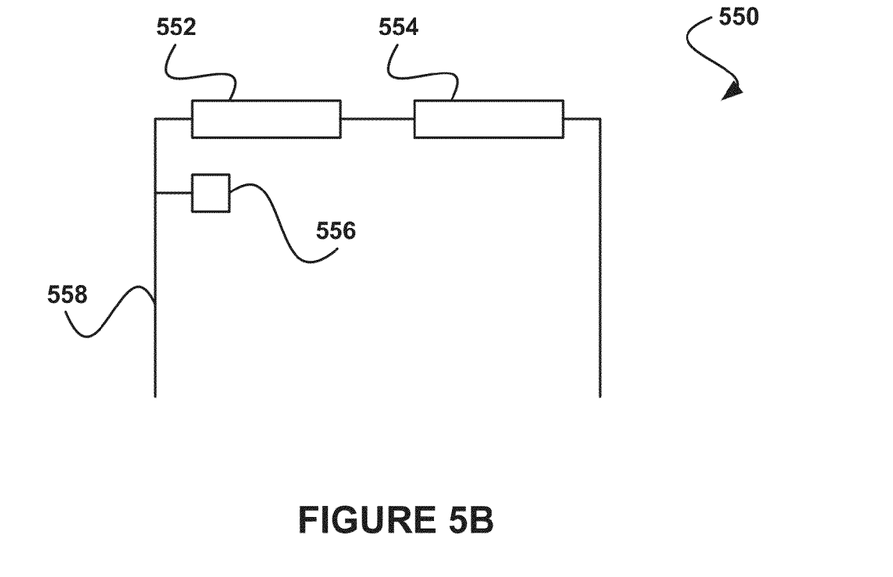
FIG. 5B shows an exemplary system for using a light sensor to determine an angle of polarization for a display device, in accordance with yet another embodiment.

FIG. 5B shows an exemplary system 550 for using alight sensor to determine an angle of polarization for a display device, in accordance with yet another embodiment. As an option, the present system 550 may be implemented in the context of the functionality and architecture of FIGS. 1-5A. Of course, however, the system 550 may be implemented in any desired environment. It should also be noted that the aforementioned definitions may apply during the present description.

In one embodiment, the shutter glasses 550 may include a left eye shutter 552, aright eye shutter 554, and a left arm 558. As an option, a light sensor 556 may be attached behind the left eye shutter 552. For example, the light sensor 556 may be attached to the left arm 558 and located behind the left eye shutter 552. As another un-illustrated option, the light sensor 556 may be attached and located behind the right eye shutter 554. As an example, the light sensor 556 may be attached to the right arm. Furthermore, as yet another un-illustrated option, the light sensor 556 may be behind both the left eye shutter 552, and the right eye shutter 554.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   determining an angle of polarization for a display device; and
   rotating an angle of polarization associated with a shutter glasses assembly to the determined angle of polarization for improving at least one aspect of viewing the display device utilizing the shutter glasses assembly, wherein the shutter glasses assembly includes an optical stack that is arranged with a first display element in front of a first filtering and polarizing element, and a second display element behind the first filtering and polarizing element and in front of a second filtering and polarizing element.

2. The method of claim 1, wherein the display device includes one of a computer display monitor, an internal display panel of a portable device, a television display, and a device capable of projecting images in sequence for transmission to at least one viewer equipped with the shutter glasses assembly.

3. The method of claim 1, wherein the shutter glasses assembly includes active shutter glasses, wherein polarization elements of the active shutter glasses are capable of being kept in a constant state in order to emulate operation of passively polarized glasses.

4. The method of claim 1, wherein each display element includes a liquid crystal display (LCD).

5. The method of claim 1, wherein the angle of polarization associated with the shutter glasses assembly is rotated to the determined angle of polarization utilizing the first display element.

6. The method of claim 1, wherein the polarization is rotated to the determined angle by altering a voltage applied to the first display element.

7. The method of claim 1, wherein a type of the display device is detected based on extended display identification data (EDID) of the display device.

8. The method of claim 7, wherein the angle of polarization for the display device is predetermined based on the type of the display device.

9. The method of claim 1, wherein an emitter in communication with the shutter glasses assembly communicates the determined angle of polarization to the shutter glasses assembly.

10. The method of claim 1, wherein the angle of polarization for the display device is determined by presenting a plurality of images to a user, changing the angle of polarization associated with the shutter glasses assembly for each image, and determining the angle of polarization for the display device based on user feedback for each image presented with at least one different angle of polarization.

11. The method of claim 10, wherein the user feedback includes at least one subjective indicator that a current image is at least one of brighter, dimmer, clearer and more distorted than a previous image or a previous setting, and the determined angle of polarization for the display device provides a brightest and a clearest image to the user.

12. The method of claim 1, wherein a user indicates that the display device is a computer display monitor, an internal display panel, or a television display via a switch on at least one of the shutter glasses assembly and an emitter.

13. The method of claim 1, wherein the angle of polarization to the display device is determined utilizing a light sensor.

14. The method of claim 13, wherein the light sensor is located behind the optical stack of the shutter glasses assembly.

15. The method of claim 14, wherein the angle of polarization for the display device is determined by changing the angle of polarization associated with the shutter glasses assembly and measuring a luminance of light transmitted through the optical stack of the shutter glasses assembly at the light sensor.

16. A computer program product embodied on a non-transitory computer readable medium, comprising:
    computer code for determining an angle of polarization for a display device; and
    computer code for rotating an angle of polarization associated with a shutter glasses assembly to the determined angle of polarization for improving at least one aspect of viewing the display device utilizing the shutter glasses assembly, wherein the shutter glasses assembly includes an optical stack that is arranged with a first display element in front of a first filtering and polarizing element, and a second display element behind the first filtering and polarizing element and in front of a second filtering and polarizing element.

17. An apparatus, comprising:
    a processor for determining an angle of polarization for a display device; and
    a shutter glasses assembly that includes an optical stack that is arranged with a first display element in front of a first filtering and polarizing element, and a second display element behind the first filtering and polarizing element and in front of a second filtering and polarizing element, wherein an angle of polarization associated with the shutter glasses assembly is rotated to the determined angle of polarization for improving at least one aspect of viewing the display device utilizing the shutter glasses assembly.

18. The apparatus of claim 17, wherein the processor remains in communication with memory and a display via a bus.

19. The apparatus of claim 17, wherein the display device includes one of a computer display monitor, an internal display panel of a portable device, a television display, and a device capable of projecting images in sequence for transmission to at least one viewer equipped with the shutter glasses assembly.

20. The apparatus of claim 17, wherein the angle of polarization for the display device is determined utilizing a light sensor.

* * * * *